US012736418B2

(12) United States Patent
Zhou et al.

(10) Patent No.: US 12,736,418 B2
(45) Date of Patent: Sep. 15, 2026

(54) TEMPERATURE SENSOR

(71) Applicant: CONTEMPORARY AMPEREX TECHNOLOGY (HONG KONG) LIMITED, Hong Kong (CN)

(72) Inventors: Cong Zhou, Ningde (CN); Xiaoteng Huang, Ningde (CN); Yuepan Hou, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 290 days.

(21) Appl. No.: 18/428,125

(22) Filed: Jan. 31, 2024

(65) Prior Publication Data

US 2024/0167893 A1 May 23, 2024

Related U.S. Application Data

(63) Continuation of application No. PCT/CN2022/125779, filed on Oct. 17, 2022.

(30) Foreign Application Priority Data

Nov. 26, 2021 (CN) ......................... 202111421093.1

(51) Int. Cl.
*G01K 13/02* (2021.01)
*G01K 1/08* (2021.01)
(Continued)

(52) U.S. Cl.
CPC ............. *G01K 13/026* (2021.01); *G01K 1/08* (2013.01); *G01K 1/14* (2013.01); *G01K 1/16* (2013.01);
(Continued)

(58) Field of Classification Search
CPC .......... G01K 13/026; G01K 1/08; G01K 1/14; G01K 1/16; G01K 7/22; G01K 13/02; Y02E 60/10
See application file for complete search history.

(56) References Cited

U.S. PATENT DOCUMENTS 4,614,443 A * 9/1986 Hamert ................. G01K 1/146 403/349
4,929,092 A * 5/1990 Taguchi ................ G01K 13/02 374/208
(Continued)

FOREIGN PATENT DOCUMENTS

CN 201352160 Y 11/2009
CN 202255677 U 5/2012
(Continued)

OTHER PUBLICATIONS

International Search Report dated Dec. 15, 2022 for Application No. PCT/CN2022/125779.
(Continued)

*Primary Examiner* — Laura Martin Sweeney
*Assistant Examiner* — Philip L Cotey
(74) *Attorney, Agent, or Firm* — Ladas & Parry, LLP

(57) ABSTRACT

A temperature sensor is described. The temperature sensor includes a body, provided with a channel for heat-exchanging liquid flowing at an interior of the body; and a sensing assembly, arranged on the body and including a temperature sensing member and a sensing casing, in which one end of the sensing casing is opened, a cavity is formed inside the sensing casing, the sensing casing is mounted on the body, a closing end of the sensing casing extends into the channel, the temperature sensing member is arranged in the cavity to sense the temperature of the heat-exchanging liquid through the sensing casing, and a thermal conductivity of the sensing casing is larger than a thermal conductivity of the body. By
(Continued)

using the material with a higher thermal conductivity in the sensing casing, the temperature conduction speed can be accelerated, and the detecting result of the temperature sensor can be more accurate.

10 Claims, 6 Drawing Sheets

(51) Int. Cl.
*G01K 1/14* (2021.01)
*G01K 1/16* (2006.01)
*G01K 7/22* (2006.01)

(52) U.S. Cl.
CPC ............... *G01K 7/22* (2013.01); *G01K 13/02* (2013.01); *Y02E 60/10* (2013.01)

(56) References Cited

U.S. PATENT DOCUMENTS 5,707,151 A * 1/1998 Parker .................... G01K 1/143 374/E1.019
7,794,141 B2 * 9/2010 Perry .................... F04B 43/073 374/44
10,996,114 B2 * 5/2021 Mothe ...................... G01K 1/08
2005/0038172 A1 * 2/2005 Nimberger ............. G01K 13/02 524/495
2010/0195698 A1 * 8/2010 Hori ......................... G01K 1/14 374/E13.006
2012/0201269 A1 * 8/2012 Mujumdar ............... G01K 1/08 29/527.1
2014/0269820 A1 * 9/2014 Perrault ................. G01K 13/02 374/54
2014/0269828 A1 * 9/2014 Engelstad ................ G01H 1/00 374/142
2015/0107344 A1 * 4/2015 Hada ........................ F01P 11/04 73/114.68
2018/0003655 A1 * 1/2018 Rud ....................... G01K 1/024
2019/0003899 A1 * 1/2019 Inagawa ................ G01K 7/021
2019/0101455 A1 * 4/2019 Mothe ...................... G01K 1/18
2021/0356333 A1 * 11/2021 LeBlanc ............. E21B 49/0875

FOREIGN PATENT DOCUMENTS

CN 108061160 A 5/2018
CN 207379635 U 5/2018
CN 207936514 U 10/2018
CN 110864822 A 3/2020
CN 212458704 U 2/2021
CN 212513475 U 2/2021
CN 212621197 U 2/2021
CN 112444282 A 3/2021
CN 214066405 U 8/2021
CN 113340450 A 9/2021
WO 2020187370 A1 9/2020

OTHER PUBLICATIONS

Office action and search report in Chinese Application No. 202111421093.1, issued on Jun. 18, 2025.
Extended European Search Report for Application No. 22897454.9, mailed on Nov. 8, 2024, 8 pages.

* cited by examiner

TEMPERATURE SENSOR

CROSS REFERENCE TO RELATED APPLICATION

The present application is a continuation of International PCT/CN2022/125779 filed on Oct. 17, 2022 that claims priority to Chinese Patent Application No. 202111421093.1 filed on Nov. 26, 2021. These applications are hereby incorporated by reference in their entirety.

TECHNICAL FIELD

The present application relates to the technical field of temperature sensing, and in particular to a temperature sensor.

BACKGROUND

In the current technical field of temperature sensing, a liquid temperature sensor is generally provided with an irregular-shaped position point on an inner wall of its conveying pipeline and mounted with a temperature sensing element to sense the liquid temperature. However, the thickness of a wall at the irregular-shaped position point on the pipeline in the prior art is relatively large due to the restriction of its production process, and due to its irregular shape, it is difficult to be controlled in production, resulting in the poor thickness uniformity of the walls of products obtained from different batches, so that it may lead to a significant impact on the consistency in actual temperature measurement.

Therefore, there is an urgent need for a temperature sensor.

SUMMARY

Embodiments of the present application provides a temperature sensor which can optimize the architecture of the temperature sensor in the prior art and ensure the consistency of temperature measurement during using.

The embodiments of the present application provide a temperature sensor includes

- a body, provided with a channel for heat-exchanging liquid flowing at an interior of the body; and
- a sensing assembly, arranged on the body and including a temperature sensing member and a sensing casing, in which one end of the sensing casing is opened, a cavity is formed inside the sensing casing, the sensing casing is mounted on the body, a closing end of the sensing casing extends into the channel, the temperature sensing member is arranged in the cavity to sense the temperature of the heat-exchanging liquid through the sensing casing, and a thermal conductivity of the sensing casing is larger than a thermal conductivity of the body.

According to the above structure, by using the material with a higher thermal conductivity in the sensing casing, the temperature conduction speed can be accelerated, and the detecting result of the temperature sensor can be more accurate.

Optionally, an extending size of the sensing casing in a third direction is smaller than an extending size of the sensing casing in a second direction, the second direction is an axis direction extending along the channel, and the third direction is orthogonal to the second direction.

According to the above structure, by setting an extending lengths of the sensing casing in the second direction and the third direction, the flow resistance at the sensing casing inside the body can be effectively reduced, the flow efficiency of the heat-exchanging liquid in the channel can be ensured, the improvement of the flow efficiency of the heat-exchanging liquid can also further fit an actual flow state in the channel, and the measurement accuracy of temperature sensing member can be improved.

Optionally, in a radial direction of the channel, a size of the sensing casing protruding from a wall face of the channel is smaller than a radius of the channel.

According to the above structure, by setting the extending length of the sensing casing in the radial direction, a flow area of the channel occupied by the sensing casing in the radial direction can be significantly reduced, and the flow resistance inside the channel can be effectively reduced.

Further, the sensing casing extends in the channel in a first direction, and the first direction is the radial direction of the channel.

Optionally, the sensing casing is made of metal material and injection molded by an inserting member of the body.

According to the above structure, by using the metal material, the thermal conductivity of the sensing casing can significantly increase, and by the injection molding by the inserting member, not only can the sealing performance inside the body be ensured, but also the sensing casing can be independently produced to improve the uniformity of the structure of the sensing casing and ensure the consistency of the temperature measurement results.

Optionally, each turning corner of the sensing casing is arranged to be a curved face.

According to the above structure, by arranging the curved face, the degree of change in the shape of an outer wall of the sensing casing can be effectively reduced, the turbulence generated when the fluid passes through the outer wall of the sensing casing can be reduced, the measurement accuracy of the temperature sensing member can be improved, and the flow resistance inside the channel can be reduced.

Optionally, the body is provided with a through hole communicated with the channel, and the sensing casing includes a casing main body and a first flange protruding from an outer surface of the casing main body, the casing main body extends into the channel through the through hole, and the first flange is inserted into a hole wall of the through hole to fix the sensing casing to the body.

According to the above structure, be arranging the first flange, a protrusion of the sensing casing for fixing to the body can be provided.

Optionally, the sensing casing further includes a second flange protruding from the outer surface of the casing main body, the first flange and the second flange are spaced apart from each other, and a portion of the body is clamped and held between the first flange and the second flange.

According to the above structure, be arranging the second flange, the stability of the connection between the sensing casing and the body in the injection molding by the inserting member can be enhanced, and the sealing performance of the connection between the sensing casing and the body can be significantly enhanced by a structure that protrudes and extends in a circumferential side direction.

Optionally, the temperature sensor further includes a connecting line, and the connecting line is connected to the temperature sensing member through an opening of the sensing casing and/or the through hole.

According to the above structure, the data sensed and obtained by the temperature sensing member can be exported.

Optionally, the temperature sensor further includes a connecting plug and an engaging block, the engaging block is connected to an outer wall of the body, the connecting plug is engaged and connected to the engaging block, and the connecting plug is connected to the connecting line to be connected with a processing device.

According to the above structure, by arranging the connecting plug, the connection between the temperature sensor and an external device can promoted.

Optionally, the temperature sensor further includes a wrapping sealing layer wrapping around a circumferential side of the temperature sensing member.

According to the above structure, the sealing performance of the temperature sensing member can improved.

Optionally, the temperature sensor further includes an injection sealing layer wrapping around a circumferential side of the wrapping sealing layer and fixed to the sensing casing.

According to the above structure, not only can the sealing performance inside the sensing casing be improved, but also a remaining space inside the sensing casing can be effectively filled, a cavity structure inside the sensing casing can be reduced, and the resonance impact caused by the fluid on the outer wall of the sensing casing can be reduced.

Compared with the prior art, in the temperature sensor of the embodiments of the present application, by adopting the metal material in the sensing casing, the rate of the temperature conduction can be accelerated, and the detecting result of the temperature sensor can be more accurate. In addition, by the injection molding by the inserting member, not only can the sealing performance inside the body be ensured, but also the sensing casing can be independently produced to improve the uniformity of the structure of the sensing casing and ensure the consistency of the temperature measurement results.

BRIEF DESCRIPTION OF THE DRAWINGS

The features, advantages and technical effects of the exemplary embodiments of the present application will be described referring to the drawings below.

In the drawings.

Figure 1:
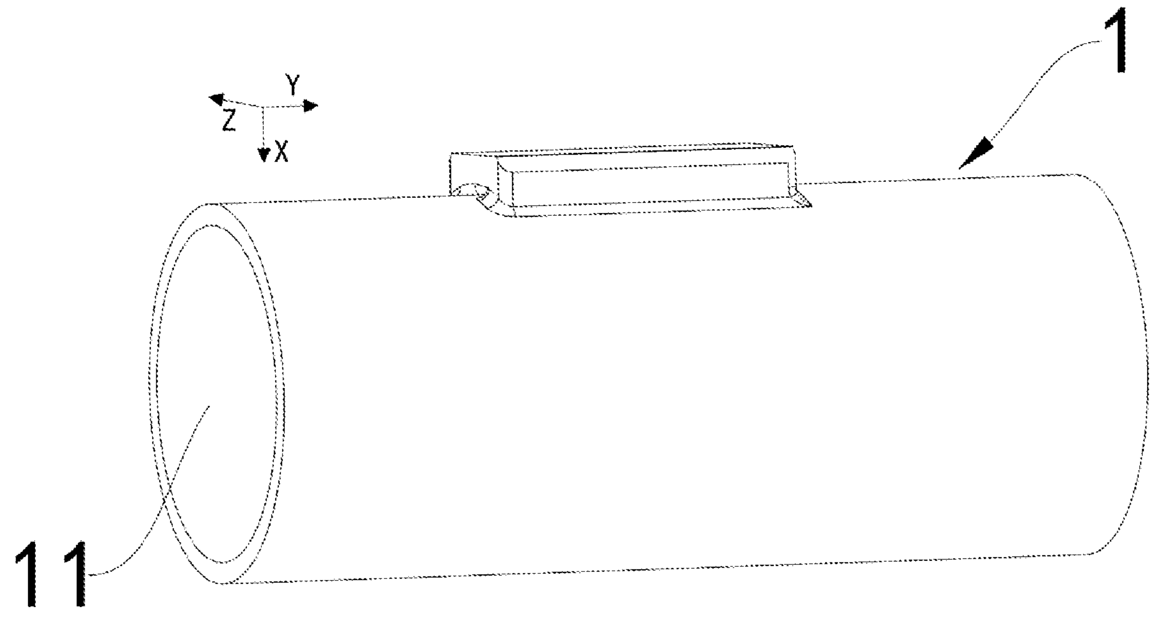
FIG. 1 shows a structural schematic view according to an embodiment of the present application.

1—body; 11—channel; 12—through hole; 2—sensing assembly; 21—temperature sensing member; 22—sensing casing; 221—curved face; 222—first flange; 223—second flange; 3—connecting line; 4—connecting plug; 5—engaging block; 6—wrapping sealing layer; 7—injection sealing layer.

In the drawings, the drawings are not drawn to actual scale.

DETAILED DESCRIPTION

The embodiments of the present application will be described in further detail below conjunction with the drawings and the embodiments. The detailed description and drawings of the following embodiments are used to exemplarily illustrate the principle of the present application, but cannot be used to limit the scope of the present application, in other words, the present application is not limited to the described embodiments.

In the description of the present application, it should be noted that, unless otherwise specified, "plurality" means more than two; the terms "upper", "lower", "left", "right", "inner", "outer", etc. indicate the orientation or positional relationship only for the convenience of describing the present application and simplifying the description, rather than indicating or implying that the device or the element referred to must have a specific orientation, be configured and operated in a specific orientation, and therefore cannot be understood as a limitation of the present application. In addition, the terms "first", "second", "third", etc. are only used for descriptive purposes, and cannot be understood as indicating or implying relative importance. The term "perpendicular" does not mean strictly perpendicular, but within the allowable range of error. The term "parallel" does not mean strictly parallel, but within the allowable range of error.

The "embodiments" referred in the present application means that specific features, structures or characteristics described in conjunction with the embodiments may be included in at least one embodiment of the present application. This word appeared in various places in the description does not necessarily refer to the same embodiment, nor is it an independent or alternative embodiment mutually exclusive with other embodiments. Those skilled in the art can explicitly or implicitly understand that the embodiments described in the present application can be combined with other embodiments.

The orientation words appearing in the following description are all directions shown in the drawings, and do not limit the specific structure of the present application. In the description of the present application, it should also be noted that, unless otherwise clearly specified and limited, the terms "mounting", "connecting" and "connected" should be understood in a broad sense, for example, it can be a fixed connection, a detachable connection, or an integral connection, it can be connected directly, or it can be connected indirectly through an intermediary. For those of ordinary skill in the art, the specific meaning of the above-mentioned terms in the present application can be understood according to specific situations.

At present, according to the development of the market situation, the traditional fossil fuels, led by oil, are still used and difficult to be completely replaced, and will be used for a long time. At the same time, the clean energy represented by electricity is also thriving. Among various types of mobile vehicles, electric energy is widely used as the driving source. However, as to a device related to the energy utilization, due to the internal energy damage, it is inevitable that a liquid temperature control circulation system is arranged in the device to monitor the accumulation situation of the internal energy in the device. At present, in the architecture of the liquid temperature control circulation systems in such device, in order to achieve the miniaturization, a detecting element is often integrated into a pipeline to form a temperature sensing detector in a type of a changeable connector, which is directly connected in series to the pipeline through which heat-exchanging liquid flows, so that the purpose of miniaturization and efficient detection can be achieved.

The inventors of the present application note that in the liquid temperature control circulation system in the prior art, the temperature sensing detector in the type of the changeable connector is usually an irregular-shaped position point provided on an inner wall of its conveying pipeline and a temperature sensing element is mounted to sense the liquid temperature. However, a thickness of a wall body at the irregular-shaped position point on the pipeline in the prior art is relatively large due to the restriction of its production process, and due to its irregular shape, it is difficult to be controlled in production, resulting in the poor thickness uniformity of the walls of products obtained from different batches. Moreover, the raw material used in the irregular-shaped position point is usually the same as the raw material of the pipeline, so that it is not ideal for heat transfer ability and may lead to a significant impact on the consistency and the measurement accuracy in the actual temperature measurement.

In order to alleviate the defects of the temperature sensing detector in the type of the changeable connector in the liquid temperature control circulation system in the prior art, the applicant has researched and found that the material of irregular-shaped position point on the pipeline of the temperature sensing detector can be adjusted, and a main body and the irregular-shaped position point can be produced separately to ensure the structural accuracy of each above part, thereby improving the accuracy and consistency of the measurement process.

According to the above considerations, in order to solve a problem of the temperature sensing detector in type of the changeable connector in the liquid temperature control circulation system in the prior art, the inventors of the present application has conducted an in-depth research and designed a temperature sensor.

The device related to the energy utilization as mentioned above can be a part with driving power used in industry, daily life, transportation and other fields. In the industry, the device may be a fan, a pump body, a driving shaft, an electric generator or the like. In the daily life, the device may be a household electric generator, a computer pillar or the like. In transportation, the device may be a fuel powered vehicle, a gas powered vehicle, a new energy vehicle, spacecraft or the like. The new energy vehicle may be a pure electric vehicle, a hybrid electric vehicle, an extended range vehicle or the like; the spacecraft includes an airplane, a rocket, a space shuttle, a space ship or the like. The embodiments of the present application do not impose specific limitation to the device related to the energy utilization as described above.

In addition, the device related to the energy utilization as described above may be a driving element, such as a battery. When used in an actual device, the battery includes a plurality of battery cells and a heat-exchanging mechanism. The temperature sensor can be arranged in series in a pipeline of the heat-exchanging mechanism to detect the temperature inside the battery in real time.

In the present application, the battery cell may include a lithium-ion secondary battery, a lithium-ion primary battery, a lithium-sulfur battery cell, a sodium lithium-ion battery cell, a sodium-ion battery cell, a magnesium-ion battery cell or the like, which is not limited in the embodiments of the present application. The battery cell can be in a shape of a cylinder, a flatten body, a cuboid or other shapes, which is not limited in the embodiments of the present application.

Figure 2:
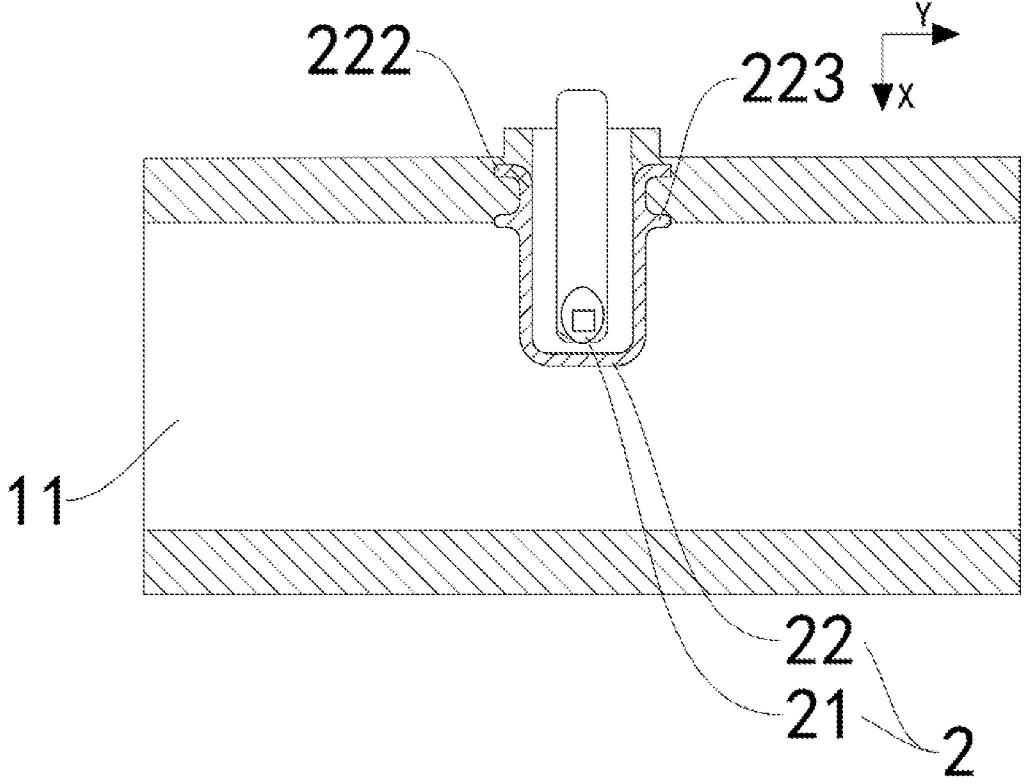
FIG. 2 shows a structural schematic view of an interior of the embodiment shown in FIG. 1.
Figure 3:
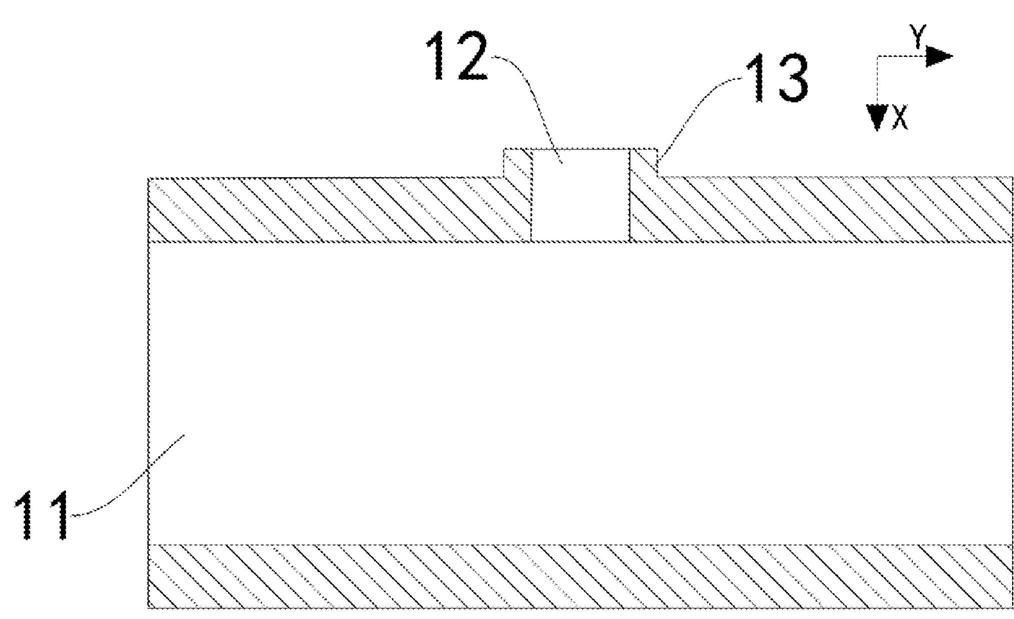
FIG. 3 shows a structural schematic view of a body of the embodiment shown in FIG. 1.

Referring to FIG. 1 to FIG. 3, in the present embodiments of the present application, a first direction is an X-axis direction, a second direction is a Y-axis direction, and a third direction is a Z-axis direction.

In some embodiments of the present application, as shown in FIG. 1 and FIG. 2, FIG. 1 shows a structural schematic view according to an embodiment of the present application; FIG. 2 shows a structural schematic view of an interior of the embodiment shown in FIG. 1. A temperature sensor is provided, which includes a body 1 and a sensing assembly 2. A channel 11 is formed at an interior of the body 1 for heat-exchanging liquid flowing. The sensing assembly 2 is arranged on the body 1 and includes a temperature sensing member 21 and a sensing casing 22. One end of the sensing casing 22 is opened and a cavity is formed inside the sensing casing 22. The sensing casing 22 is mounted on the body 1 and a closing end of the sensing casing 22 extends into the channel 11. The temperature sensing member 21 is arranged in the cavity to sense the temperature of the heat-exchanging liquid through the sensing casing 22. A thermal conductivity of the sensing casing 22 is larger than a thermal conductivity of the body 1.

The channel 11 formed at the interior of the body 1 penetrates through two ends of the body 1. Unlimitedly, a cross-section of the channel 11 may be of various shapes and sizes, such as a cube, a cylinder, a hexagonal prism. Specifically, the shape of channel 11 can be determined based on a structure of a pipeline at a connecting position of the temperature sensor and the flow per unit time. Unlimitedly, the material of channel 11 may be an injection molded plastic, such as UPVC, polyethylene, hard polyvinyl chloride, polyethylene, chlorinated polyvinyl chloride, type III polypropylene, cross-linked polyethylene, polybutene. Unlimitedly, the temperature sensing member 21 can use a semiconductor temperature measuring element, such as a germanium semiconductor and a silicon semiconductor. Specifically, the temperature sensing member 21 can use a NTC (Negative Temperature Coefficient) thermistor, so that it can utilize the semiconductor material or element with a high negative temperature coefficient to achieve the rapid response to the temperature sensing. For example, the metal oxide, such as manganese, cobalt, nickel, and copper, can be used as the main material and the ceramic process can be used, which are not limited in the embodiments of the present application.

Referring to FIG. 1 and FIG. 3, FIG. 1 shows a structural schematic view according to an embodiment of the present application; FIG. 3 shows a structural schematic view of the body of the embodiment shown in FIG. 1. The body 1 can be provided as a tube body arranged transversally, and the channel 11 is an internal cavity in the tube body. Specifically, an opening end of the sensing casing 22 is fixed in a wall of the tube body, the closing end of the sensing casing 22 extends into the channel 11, and a reinforcement platform 13 is arranged at a corresponding position of an opening of the sensing casing 22 on the tube body. The reinforcement platform 13 can increase the thickness at a connecting place of the sensing casing 22 on the body 1, so that a top end of the sensing casing 22 can be completely buried in the body 1 during connection. Unlimitedly, the sensing casing 22 extends downwards in a first direction from a top portion of the body 1.

Figure 5:
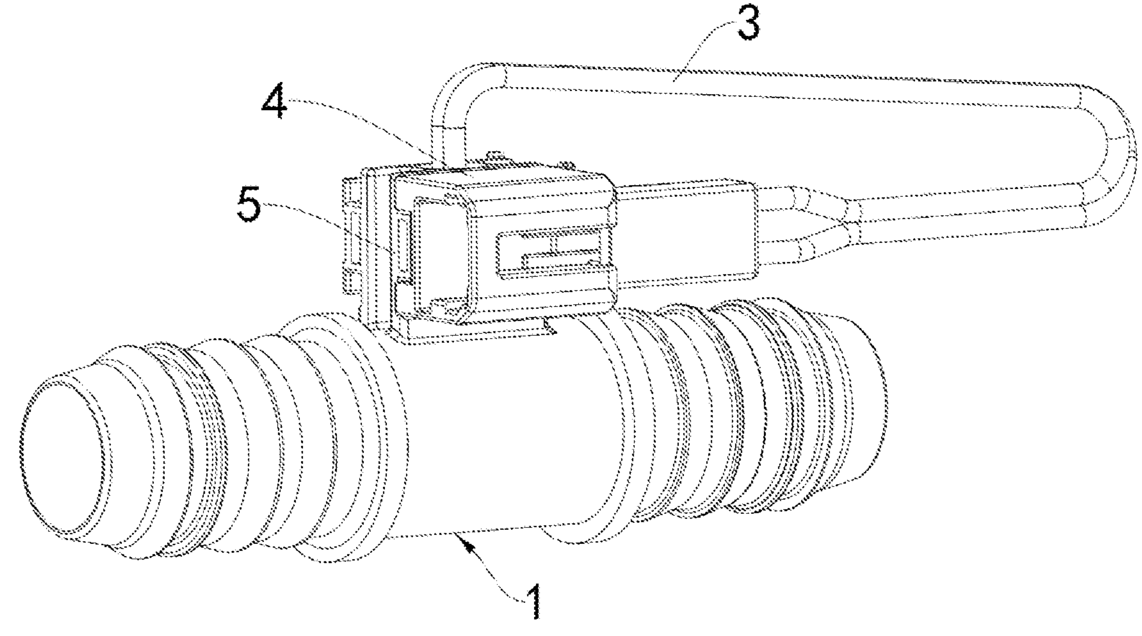
FIG. 5 shows a structural schematic view according to another embodiment of the present application.

Referring to FIG. 5, FIG. 5 shows a structural schematic view according to another embodiment of the present application. Two ends of the body 1 can be provided with connectors for connecting with pipelines in a liquid temperature control circulation system, respectively. Specifically, a plurality of layers of annular protrusions spaced apart from one another in an axis direction of each connector are arranged at each connector, and the radii of the plurality of layers of the annular protrusions are different.

By replacing the sensing casing 22 with a material with higher thermal conductivity, the temperature transfer rate on a circumferential side of the temperature sensing member 21 can be significantly enhanced, so that the measurement accuracy of the temperature sensing member 21 can be significantly improved and the consistency of the measurement results can be ensured.

In some embodiments of the present application, as shown in FIG. 1, FIG. 2, and FIG. 3, FIG. 1 shows the structural schematic view according to the embodiment of the present application; FIG. 2 shows the structural schematic view of the interior of the embodiment shown in FIG. 1; FIG. 3 shows the structural schematic view of the body of the embodiment shown in FIG. 1. An extending size of the sensing casing 22 in a third direction is smaller than an extending size of the sensing casing 22 in a second direction, the second direction is an axis direction extending along the channel 11, and the third direction is orthogonal to the second direction.

Figure 4:
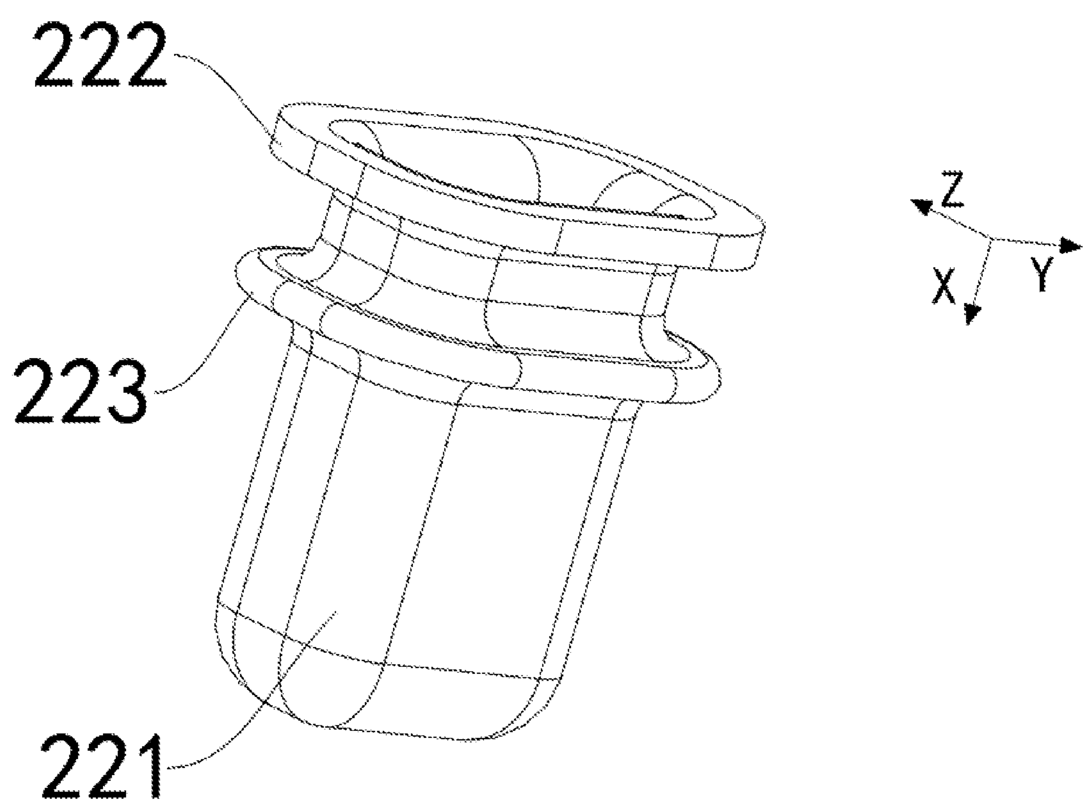
FIG. 4 shows a structural schematic view of an embodiment of a sensing casing according to the embodiment shown in FIG. 1.

Referring to FIG. 4, FIG. 4 shows a structural schematic view of an embodiment of the sensing casing according to the embodiment shown in FIG. 1. A portion of the sensing casing 22 located in the channel 11 includes a long edge arranged in an axial direction of channel 11, a high edge arranged in a radial direction of the channel 11, and is in a shape of a cuboid extending into the channel 11. Each turning corner of the sensing casing 22 is arranged to be a curved face 221. Unlimitedly, a face of a portion of the sensing casing 22 located in the channel 11 and facing to a direction of the heat-exchanging liquid flowing in channel 11 can be arranged to be a curved face.

By setting the extending lengths of the sensing casing 22 in the second direction and the third direction, the flow resistance at the sensing casing 22 inside the body 1 can be effectively reduced, the flow efficiency of the heat-exchanging liquid in the channel 11 can be ensured, the improvement of the flow efficiency of the heat-exchanging liquid can also further fit an actual flow state in the channel 11, and the measurement accuracy of temperature sensing member 21 can be improved. In addition, by arranging the curved face 221, the degree of change in the shape of an outer wall of the sensing casing 22 can be effectively reduced, the turbulence generated when the fluid passes through the outer wall of the sensing casing 22 can be reduced, the measurement accuracy of the temperature sensing member 21 can be improved, and the flow resistance inside the channel 11 can be reduced.

Figure 6:
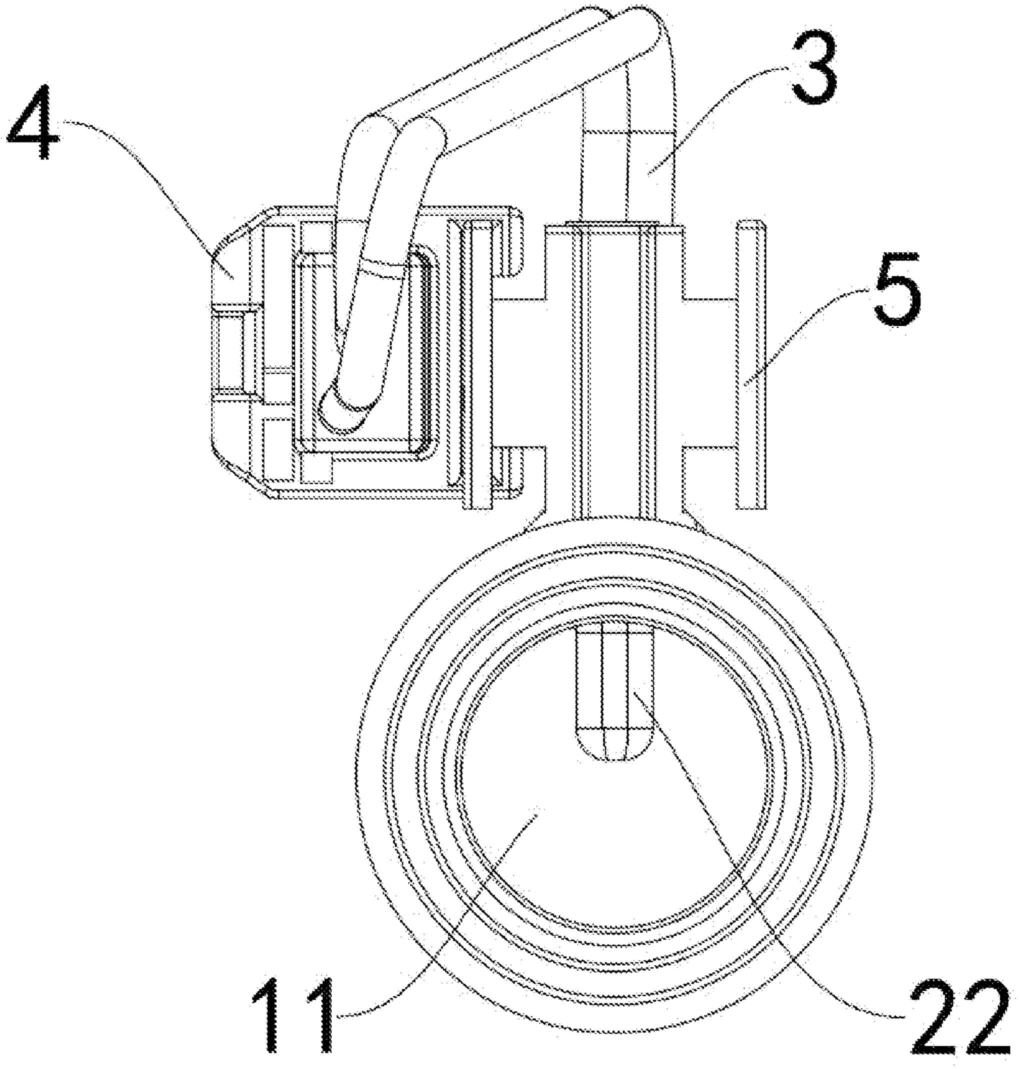
FIG. 6 shows a structural schematic view of an embodiment of an end portion of a body according to the embodiment shown in FIG. 5.
Figure 7:
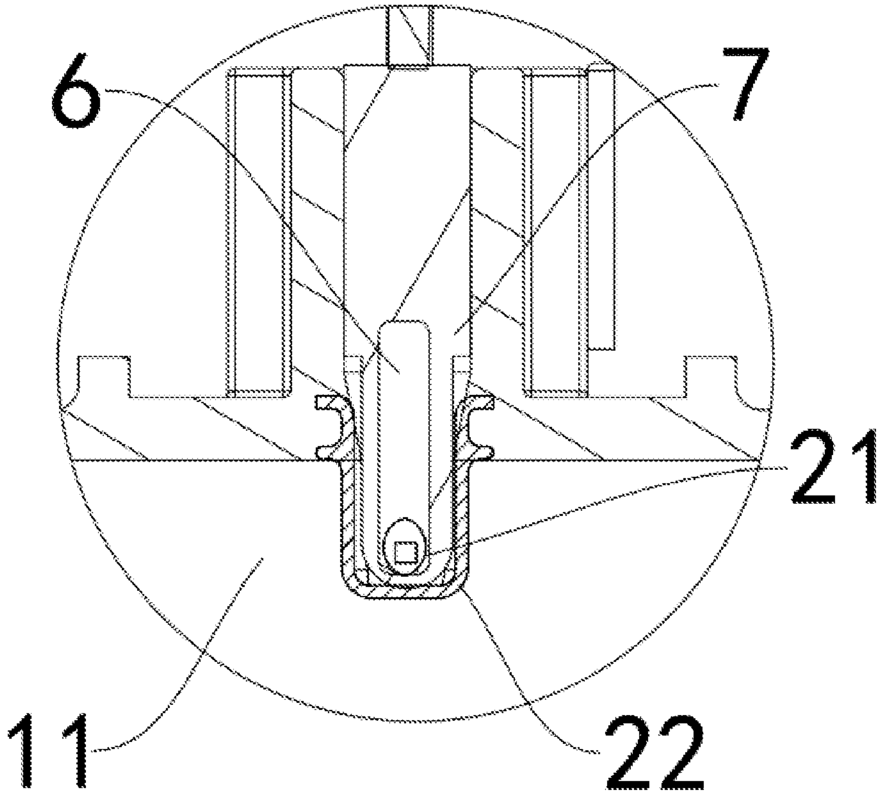
FIG. 7 shows a structural schematic view of an interior according to the embodiment shown in FIG. 5.

In some embodiments of the present application, as shown in FIG. 2, FIG. 6, and FIG. 7, FIG. 2 shows the structural schematic view of the interior of the embodiment shown in FIG. 1; FIG. 6 shows a structural schematic view of an embodiment of an end portion of the body 1 according to the embodiment shown in FIG. 5, and FIG. 7 shows a structural schematic view of an interior according to the embodiment shown in FIG. 5. In the radial direction of the channel 11, a size of the sensing casing 22 protruding from a wall face of the channel 11 is smaller than a radius of the channel 11.

Herein, when the sensing casing 22 extends irregularly in the radial direction, the maximum size of the sensing casing 22 protruding from the wall face of the channel 11 in the radial direction is smaller than the radius of channel 11. Specifically, the extending direction of the sensing casing 22 in channel 11 is in the first direction of the radial direction, and the first direction is orthogonal to the second direction and the third direction.

By setting the extending length of the sensing casing 22 in the radial direction, a flow area of the channel 11 occupied by the sensing casing 22 in the radial direction can be significantly reduced, the sufficient flow area at the position of the sensing casing 22 can be ensured, and the flow resistance inside the channel 11 can be effectively reduced.

In some embodiments of the present application, as shown in FIG. 2 and FIG. 7, FIG. 2 shows the structural schematic view of the interior of the embodiment shown in FIG. 1, and FIG. 7 shows the structural schematic view of the interior according to the embodiment shown in FIG. 5. The sensing casing 22 is made of metal material and is injection molded with the body 1 by an inserting member.

The sensing casing 22 is made of metal material that is resistant to the corrosion of the heat-exchanging liquid. Unlimitedly, the heat-exchanging liquid is water, and the sensing casing 22 is made of the metal material that is resistant to the corrosion of the water, such as copper, nickel or cobalt. Specifically, after the sensing casing 22 is made of the metal material and completed separately, the sensing casing 22 is fixed to the body 1 using an inserting member technology during the injection molding process of the body 1.

By using the metal material, the thermal conductivity of the sensing casing 22 can significantly increase, so that the temperature sensing member 21 inside the sensing casing 22 can perform the sensing work more accurately. Herein, by means of the injection molding by the inserting member, the sensing housing 22 can be manufactured separately, the thicknesses at all places of the wall of the sensing casing 22 can be ensured to be even. The problem of the uneven thicknesses of the wall at irregular places caused by using the injection molding process to integrate the body 1 and sensing casing 22 can be solved, the impact of the thickness of the wall of sensing casing 22 on the sensing process can be alleviated, and the consistency of the temperature measurement results can be ensured. In addition, the injection molding process by the inserting member can also ensure the sealing performance of the connection between the sensing casing 22 and the body 1, so that it can prevent the liquid leakage at the connection between the sensing casing 22 and the body 1 and prolong the service life of the temperature sensing member in the actual usage.

In some embodiments of the present application, as shown in FIG. 2 and FIG. 7, FIG. 2 shows the structural schematic view of the interior of the embodiment shown in FIG. 1, and FIG. 7 shows the structural schematic view of the interior according to the embodiment shown in FIG. 5. The body 1 is provided with a through hole 12 communicated with the channel 11, and the sensing casing 22 includes a casing main body and a first flange 222 protruding from an outer surface of the casing main body. The casing main body extends into the channel 11 through the through hole 12, and the first flange 222 is inserted into a hole wall of the through hole 12 to fix the sensing casing 22 to the body 1.

Herein, the arrangement of the through hole 12 is used to enable the cavity inside the sensing casing 22 to be communicated with an exterior of the body 1. Specifically, the through hole 12 is fitted with the casing main body and the first flange 222, so that when the sensing casing 22 is fixed on the through hole 12, the communication between the through hole 12 and the channel 11 can be blocked. Unlimitedly, the casing main body can fill with a space inside the through hole 12. Unlimitedly, the casing main body can fill at least a portion of the space inside the through hole 12. Unlimitedly, the first flange 222 can be at least partially inserted into the hole wall of the through hole 12. Unlimitedly, the first flange 222 can be arranged at an opening of the through hole 12 on an outer wall of the body 1. Unlimitedly, the first flange 222 can be provided at a place of the communication between the through hole 12 and the channel 11. Unlimitedly, the first flange 222 can be arranged at a top end of the casing main body, and further, the first flange 222 is formed by bending the top end of the casing main body towards the circumferential side.

By arranging the first flange 222, a protrusion of the sensing casing 22 for fixing to the body 1 can be provided. When the first flange 222 is arranged at the top end of the casing main body and at the place of the communication between the through hole 12 and the channel 11, the requirement of the extending size of the sensing casing 22 in the channel 11 and the requirement of the sensing casing 22 fixing on the body 1 can be met. In addition, the size of the sensing casing 22 can be compacted maximally, the impact of the increased weight of the sensing casing 22 caused by using the metal material can be alleviated, and the production waste can be reduced.

In some embodiments of the present application, as shown in FIG. 2, FIG. 4, and FIG. 7, FIG. 2 shows the structural schematic view of the interior of the embodiment shown in FIG. 1, FIG. 4 shows the structural schematic view of the embodiment of the sensing casing 22 according to the embodiment shown in FIG. 1, and FIG. 7 shows the structural schematic view of the interior according to the embodiment shown in FIG. 5. The sensing casing 22 further includes a second flange 223 protruding from the outer surface of the casing main body, the first flange 222 and the second flange 223 are spaced apart from each other, and a portion of the body 1 is clamped and held between the first flange 222 and the second flange 223.

Herein, the sensing casing 22 includes at least one second flange 223. Specifically, the second flange 223 is spaced apart from the first flange 222, and a plurality of second flanges 223 are spaced apart from one another. Unlimitedly, at least a portion of the body 1 is clamped and held between the second flanges 223. Unlimitedly, the sensing casing 22 includes one second flange 223. Further, when the sensing casing 22 is connected to the body 1, the first flange 222 is arranged above the second flange 223 in the first direction, and the second flange 223 is arranged at the place of the communication between the through hole 12 and the channel 11. Unlimitedly, a lower edge of the second flange 223 can contact with a space of channel 11. By arranging the second flange 223, the stability of the connection between the sensing casing 22 and the body 1 in the injection molding by the inserting member can be enhanced, and by a structure that protrudes and extends in the circumferential side direction, more tortuous changes on a connecting face between the through hole 12 and the sensing casing 22 can be produced, so that the heat-exchanging liquid is difficult to permeate between the through hole 12 and the sensing casing 22, and the sealing performance of the connection between the sensing casing 22 and the body 1 can be significantly enhanced.

Figure 8:
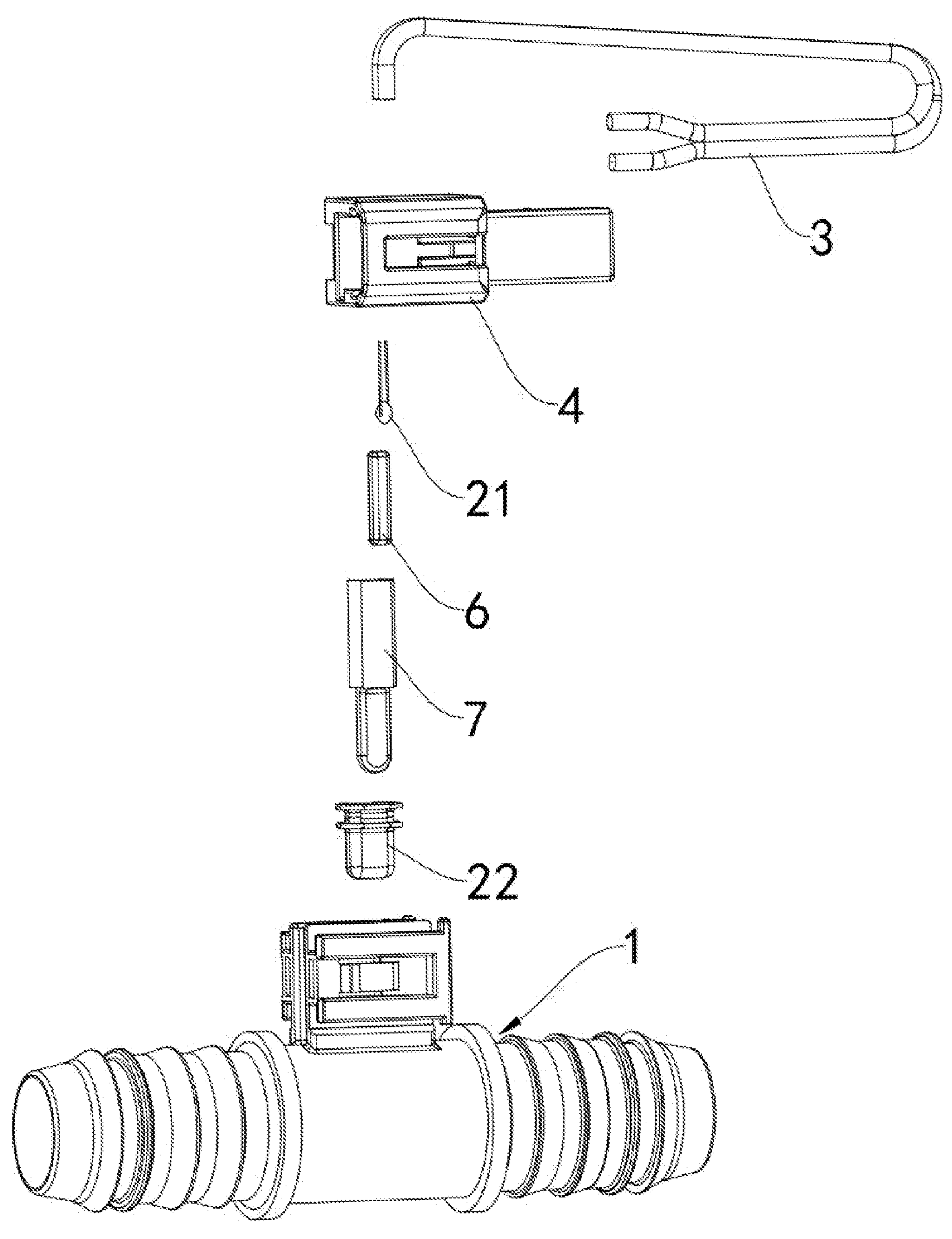
FIG. 8 shows an exploded schematic view according to the embodiment shown in FIG. 5.

In some embodiments of the present application, as shown in FIG. 7 and FIG. 8, FIG. 7 shows the structural schematic view of the interior according to the embodiment shown in FIG. 5, and FIG. 8 shows an exploded schematic view according to the embodiment shown in FIG. 5. The temperature sensor further includes a connecting line 3 which is connected with the temperature sensing member 21 through the opening and/or the through hole 12 of the sensing casing 22.

Herein, the connecting line 3 extends from the exterior of the body 1 into the cavity inside the sensing casing 22 and is connected to the temperature sensing member 21, so as to transmit the data information sensed by the temperature sensing member 21 from the temperature sensing member 21. Unlimitedly, when the casing main body fully fills the space inside the through hole 12, the opening of the sensing casing 22 is directly communicated with an external space of the body 1, and the connecting line 3 can directly extend from the opening to the cavity and be connected to the temperature sensing member 21. Unlimitedly, when the casing main body fills a portion of the space inside the through hole 12, the opening is communicated with a remaining space of the through hole 12. The connecting line 3 extends from the external space of the body 1 to the through hole 12 firstly, then enters into the opening, and finally connects with the temperature sensing member 21 in the cavity. Specifically, the connecting line 3 adopts a data transmission line, such as a dual-line transmission line, a microstrip transmission line, a waveguide transmission line, a surface wave transmission line and an optical fiber, which can be selected according to the actual usage needs.

By the arrangement of the connecting line 3, the data sensed and obtained by the temperature sensing member 21 can be exported. In addition, in two states that the casing main body fills a portion of the space inside the through hole 12 and the casing main body fully fills the space inside the through hole 12, the connecting line 3 and the temperature sensing member 21 can be connected and wrapped in a multi-layer structure, so as to ensure the stability of the connection.

In some embodiments of the present application, as shown in FIG. 5 and FIG. 8, FIG. 5 shows the structural schematic view according to another embodiment of the present application, and FIG. 8 shows an exploded schematic view according to the embodiment shown in FIG. 5. The temperature sensor further includes a connecting plug 4 and an engaging block 5. The engaging block 5 is connected to the outer wall of the body 1, the connecting plug 4 is connected to the engaging block 5, and the connecting plug 4 is connected to the connecting line 3 for connecting with a processing device.

Herein, the engaging block 5 can be integrated with the body 1 by injection molding. Specifically, the engaging block 5 is provided with a sliding rail, and the connecting plug 4 is provided with a sliding groove. The sliding groove is matched with the sliding rail to achieve an engaging connection between the engaging block 5 and the sliding rail. Unlimitedly, the connecting plug 4 is provided with a data outputting connecting plug for exporting a signal conducted by the connecting line 3, such as a Universal Serial Bus (USB), an IEEE1394 interface (FireWire), a serial communication port (commercial). Specifically, the data outputting connecting plug can be selected according to the communication protocols applied in actual usage, such as RS-485 or RS-232C. Specifically, the processing device can be a control terminal arranged on a mobile vehicle, such as an onboard processor.

By arranging the connecting plug 4, it can facilitate the connection between the temperature sensor to the external processing device. In addition, the connecting plug 4 can be effectively integrated onto the body 1 through the engaging block 5, and the temperature sensor is highly integrated, so that the temperature sensor can be connected in series to the pipeline in a to-be-tested liquid temperature control circulation system merely through end portions at two ends of the channel 11, without the need for the additional fixing structure. Thus, it can ensure that the temperature sensor can be widely applicable to various working environments of the liquid temperature control circulation system.

In some embodiments of the present application, as shown in FIG. 7 or FIG. 8, FIG. 7 shows the structural schematic view of the interior according to the embodiment shown in FIG. 5, and FIG. 8 shows an exploded schematic view according to the embodiment shown in FIG. 5.

The temperature sensor further includes a wrapping sealing layer 6 wrapping around the circumferential side of the temperature sensing member 21.

Herein, the wrapping sealing layer 6 is made of a corrosion-proof material. Unlimitedly, the wrapping sealing layer 6 can be made of phenolic resin, epoxy resin, polyester resin, polyethylene, polypropylene, polyvinyl chloride, chlorinated polyether or the like.

By arranging the wrapping sealing layer 6, it can improve the sealing performance of the temperature sensing member 21 and prevent the impact of other fillers in the cavity on the temperature sensing member 21.

In some embodiments of the present application, as shown in FIG. 7 and FIG. 8, FIG. 7 shows the structural schematic view of the interior according to the embodiment shown in FIG. 5, and FIG. 8 shows an exploded schematic view according to the embodiment shown in FIG. 5. The temperature sensor further includes an injection sealing layer 7 wrapping around a circumferential side of the wrapping sealing layer 6.

Herein, the injection sealing layer 7 is used to fill the remaining space inside the through hole 12 and the cavity and fix the temperature sensing member 21 and the connecting line 3. Unlimitedly, the temperature sensing member 21 is fixed at a bottom portion of the cavity. Unlimitedly, when the casing main body fully fills the space inside the through hole 12, the injection sealing layer 7 fills in the cavity. Unlimitedly, when the casing main body fills a portion of the space inside the through hole 12, the injection sealing layer 7 fills in the cavity and through hole 12. Unlimitedly, the injection sealing layer 7 can be made of thermal conductive silicone grease.

By arranging the injection sealing layer 7, not only can the sealing performance inside the sensing casing 22 be improved, but also the remaining space inside the sensing casing 22 can be effectively filled, so that the cavity structure inside the sensing casing 22 can be reduced and the impact of the resonance caused by the fluid on the outer wall of the sensing casing 22 can be alleviated. In addition, the arrangement of the injection sealing layer 7 can also promote the transfer of heat from the sensing casing 22 to the circumferential side of the temperature sensing member 21.

In some optional embodiments of the present application, the temperature sensor includes the body 1, the sensing assembly 2, the connecting line 3, the connecting plug 4, the engaging block 5, the wrapping sealing layer 6 and the injection sealing layer 7. The body 1 is provided as the tube body arranged transversally, and the channel 11 is an internal cavity in the tube body. The channel 11 is in a shape of a cylinder and penetrates through two ends of the body 1. Two ends of the body 1 can be provided with the connectors for connecting with pipelines in the liquid temperature control circulation system, respectively. The sensing assembly 2 includes the sensing casing 22 and the temperature sensing member 21 which is located in the cavity inside the sensing casing 22. The portion of the sensing casing 22 located in the channel 11 includes the long edge arranged in the axial direction of channel 11, the high edge arranged in the radial direction of the channel 11, and is in a shape of the cuboid extending into the channel 11. Each turning corner of the sensing casing 22 is arranged to be the curved face 221. The maximum size of the sensing casing 22 protruding from the wall face of the channel 11 in the radial direction is smaller than the radius of channel 11, and the sensing casing 22 is made of the metal material and injection molded with the body 1 by the inserting member. The body 1 is provided with the through hole 12 communicated with the channel 11, and the sensing casing 22 includes the casing main body, the first flange 222 and the second flange 223 protruding from an outer surface of the casing main body. The first flange 222 is formed by bending the top end of the casing main body towards the circumferential side, and the second flange 223 is spaced apart from the first flange 222. When the sensing casing 22 is connected to the main body 1, the first flange 222 is arranged above the second flange 223 in the first direction, and the second flange 223 is arranged at the place of the communication between the through hole 12 and the channel 11. The casing main body fills a portion of the space inside the through hole 12, the opening of the sensing casing 22 is communicated with the remaining space of the through hole 12, the connecting line 3 extends from the external space of the body 1 into the through hole 12 firstly, then enters into the opening, and finally connects to the temperature sensing member 21 in the cavity. The wrapping sealing layer 6 wraps around the circumferential side of the temperature sensing member 21. The injection sealing layer 7 fills the remaining space of the cavity and the through hole 12, and fixes the temperature sensing member 21 and the connecting line 3.

Compared with the prior art, in the temperature sensor of the present embodiment, by adopting the metal material in the sensing casing 22, the rate of the temperature conduction can be accelerated, and the detecting result of the temperature sensor can be more accurate. In addition, by the injection molding by the inserting member, not only can the sealing performance inside the body 1 be ensured, but also the sensing casing 22 can be independently produced to improve the uniformity of the structure of the sensing casing 22 and ensure the consistency of the temperature measurement results.

Although the present application has been described with reference to the preferred embodiments, various modifications may be made thereto and equivalents may be substituted for parts thereof without departing from the scope of the present application. In particular, as long as there are no structural conflicts, the technical features mentioned in each of the embodiments can be combined in any way. The present application is not limited to the specific embodiments disclosed herein, but includes all technical solutions falling within the scope of the claims.

What is claimed is:

1. A temperature sensor, comprising a body, provided with a channel for heat-exchanging liquid flowing at an interior of the body; and a sensing assembly, arranged on the body and comprising a temperature sensing member and a sensing casing, wherein one end of the sensing casing has an open end with a cavity inside, the sensing casing being mounted on the body such that a closed end of the sensing casing extends into the channel along a first direction that is normal to an inner wall of the channel and directed to a center of the channel in a plane perpendicular to an axis of the channel, the temperature sensing member being arranged in the cavity to sense a temperature of the heat-exchanging liquid through the sensing casing, and a thermal conductivity of the sensing casing being larger than a thermal conductivity of the body;

wherein an extending size of the sensing casing in a third direction is smaller than an extending size of the sensing casing in a second direction, the second direction being an axis direction extending along the channel, and the third direction is orthogonal to the first and second directions.

2. The temperature sensor according to claim 1, wherein a size of the sensing casing protruding from a wall face of the channel is smaller than a radius of the channel in a radial direction of the channel.

3. The temperature sensor according to claim 1, wherein the sensing casing is made of metal material and the body is a product of an injection molding around a portion of the sensing casing.

4. The temperature sensor according to claim 1, wherein the body is provided with a through hole communicated with the channel, the sensing casing comprises a casing main body and a first flange protruding from an outer surface of the casing main body, the casing main body extends into the channel through the through hole, and the first flange is inserted into a hole wall of the through hole to fix the sensing casing to the body.

5. The temperature sensor according to claim 4, wherein the sensing casing further comprises a second flange protruding from the outer surface of the casing main body, the first flange and the second flange are spaced apart from each other, and a portion of the body is clamped and held between the first flange and the second flange.

6. The temperature sensor according to claim 4, further comprising a connecting line, wherein the connecting line is connected to the temperature sensing member through an opening of the sensing casing and/or the through hole.

7. The temperature sensor according to claim 6, wherein further comprising a connecting plug and an engaging block, wherein the engaging block is connected to an outer wall of the body, the connecting plug is engaged and connected with the engaging block, and the connecting plug is connected with the connecting line to be connected with a processing device.

8. The temperature sensor according to claim 1, further comprising a wrapping sealing layer wrapping around a circumferential side of the temperature sensing member.

9. The temperature sensor according to claim 8, further comprising an injection sealing layer wrapping around a circumferential side of the wrapping sealing layer and fixed to the sensing casing.

10. A temperature sensor, comprising a body, provided with a channel for channeling a flow of heat-exchanging liquid, the channel having channel walls; and a sensing assembly, attached to the body and comprising a temperature sensing member and a sensing casing, the sensing casing having a shape of a hollow cuboid having a height in a first direction, a length in a second direction and a width in a third direction, the width being smaller than the height and smaller from the length; the hollow cuboid comprising side walls having distal ends joined in a distal periphery and having proximal ends joined in a proximal periphery, the distal periphery being sealed by a cap and the proximal periphery opening to a cavity limited by the side walls and the cap;

the sensing casing being mounted on the body such that, the second direction being parallel to an axis of the channel and, in a plane perpendicular to the second direction, the first direction pointing from a wall of the channel toward a center of the channel, the cap and a portion of the side walls protrude in the channel; the temperature sensing member being arranged in the cavity to sense a temperature of the heat-exchanging liquid through the sensing casing, and a thermal conductivity of the sensing casing being larger than a thermal conductivity of the body.

* * * * *